(12) United States Patent
Tseng et al.

(10) Patent No.: US 10,377,066 B1
(45) Date of Patent: *Aug. 13, 2019

(54) MOLDING SYSTEM FOR PREPARING FIBER-REINFORCED THERMOPLASTIC COMPOSITE ARTICLE

(71) Applicant: CORETECH SYSTEM CO., LTD., Chupei, Hsinchu County (TW)

(72) Inventors: Huan-Chang Tseng, Chupei (TW); Rong-Yeu Chang, Chupei (TW); Chia-Hsiang Hsu, Chupei (TW)

(73) Assignee: CORETECH SYSTEM CO., LTD., Chupei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,114

(22) Filed: Dec. 20, 2018

Related U.S. Application Data

(60) Provisional application No. 62/625,061, filed on Feb. 1, 2018.

(51) Int. Cl.
  *B29C 45/76* (2006.01)
  *B29C 45/00* (2006.01)
  (Continued)

(52) U.S. Cl.
  CPC .......... *B29C 45/0005* (2013.01); *B29C 45/76* (2013.01); *B29C 45/77* (2013.01);
  (Continued)

(58) Field of Classification Search
  CPC ........ B29C 45/0005; B29C 2045/0008; B29C 2945/76652
  See application file for complete search history.

(56) References Cited

U.S. PATENT DOCUMENTS

| 9,862,133 B1 | 1/2018 | Tseng et al. |
| 10,201,918 B1 * | 2/2019 | Favaloro ................. B29C 43/58 |
| 10,201,921 B1 * | 2/2019 | Tseng ..................... B29C 45/77 |

OTHER PUBLICATIONS

Truckenmüller F, Fritz H-G. Injection molding of long fiber-reinforced thermoplastics: A comparison of extruded and pultruded materials with direct addition of roving strands. Polym Eng Sci 1991; 31 1316-1329.

(Continued)

*Primary Examiner* — Robert B Davis
(74) *Attorney, Agent, or Firm* — Muncy, Geissler, Olds & Lowe, P.C.

(57) ABSTRACT

The present disclosure provides a molding system for preparing a fiber-reinforced thermoplastic composite article. The molding system includes: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine; and a controller coupled to the processing module and configured to control the molding machine with the molding condition to perform an actual molding process for preparing the fiber-reinforced thermoplastic composite article. The anisotropic stress distribution of the composite molding resin is generated based in part on consideration of an integral effect of an elongational viscosity and a shear viscosity of the composite molding material.

8 Claims, 15 Drawing Sheets

(51) Int. Cl.
*B29C 45/77* (2006.01)
*B29K 101/12* (2006.01)

(52) U.S. Cl.
CPC .............. *B29C 2045/0008* (2013.01); *B29C 2945/76652* (2013.01); *B29K 2101/12* (2013.01)

(56) References Cited

OTHER PUBLICATIONS

Dinh SM, Armstrong RC. A rheological equation of state for semiconcentrated fiber suspensions. J Rheol 1984; 28 207-227.

Lipscomb II GG, Denn MM, Hur DU, Boger DV. The flow of fiber suspensions in complex geometries. J Non-Newtonian Fluid Mech 1988; 26 297-325.

Wang J, O'Gara JF, Tucker III CL. An objective model for slow orientation kinetics in concentrated fiber suspensions: Theory and rheological evidence. J Rheol 2008; 52(5) 1179-1200.

Chung ST, Kwon TH. Invariant-based optimal fitting closure approximation for the numerical prediction of flow-induced fiber orientation. The Society of Rheology, Inc. J. Rheol. 46(1), Jan./Feb. 2002; pp. 169-194.

VerWeyst Be, Tucker III CL. Fiber suspensions in complex geometries: Flow/orientation coupling. Can J Chem Eng 2002; 80(6) 1093-1106.

Mazahir SM, Vélez-García GM, Wapperom P, Baird DG. Evolution of fiber orientation in radial direction in a center-gated disk: Experiments and simulation. Compos Pt A—Appl Sci Manuf 2013; 51 108-117.

Tang L, Altan MC. Entry flow of fiber suspensions in a straight channel. J Non-Newtonian Fluid Mech 1995; 56 183-216.

Li T, Luyé J-F. Flow-fiber coupled viscosity in injection molding simulations of short fiber reinforced thermoplastics. Int Polym Process 2018; In press (htttps://www.researchgate.net/publication/322438226_Flow-fiber_coupled_viscosity_in_injection_molding_simulations_of_short_fiber_reinforced_thermoplastics); pp. 1-22.

Favaloro AJ. Rheological behavior and manufacturing simulation of prepreg platelet molding systems. Ph.D. Thesis, Purdue University; 2017; pp. 1-297.

Favaloro Aj, Pipes Rb, Tseng H-C. A new anisotropic flow simulation for compression molding of glass-mat thermoplastics. In: Polymer Processing Society (Pps) 34th. Taipen, Taiwan, 2018. pp. 112-122.

Advani SG, Tucker III CL. Closure approximations for three-dimensional structure tensors. J Rheol 1990; 34 367-386.

Advani SG, Tucker III CL. The use of tensors to describe and predict fiber orientation in short fiber composites. J Rheol 1987; 31(8) 751-784.

Pipes RB, Coffin DW, Simacek P, Shuler SR, Okine RK. Rheological behavior of collimated fiber thermoplastic composite materials. In: Advani SG, editor. Flow and rheology in polymer composites manufacturing. Amsterdam: Elsevier, 1994. p. 85-125.

Thomasset J, Carreau PJ, Sanschagrin B, Ausias G. Rheological properties of long glass fiber filled polypropylene. J Non-Newtonian Fluid Mech 2005; 125 25-34.

Tseng H-C, Chang R-Y, Hsu C-H. Numerical predictions of fiber orientation for injection molded rectangle plate and tensile bar with experimental validations. Int Polym Process 2018; 33 96-105.

Tseng H-C, Chang R-Y, Hsu C-H. An objective tensor to predict anisotropic fiber orientation in concentrated suspensions. J Rheol 2016; 60(2) 215-224.

Rong-Yeu Chang and Wen-hsien Yang, "Numerical simulation of mold filling in injection molding using a three-dimensional finite volume approach," International Journal for Numerical Methods in Fluids vol. 37, Issue 2, pp. 125-148, Sep. 30, 2001.

Cross (1979). Relation between viscoelasticity and shear-thinning behavior in liquids. Rheology Acta, 18(5), 609-614.

\* cited by examiner

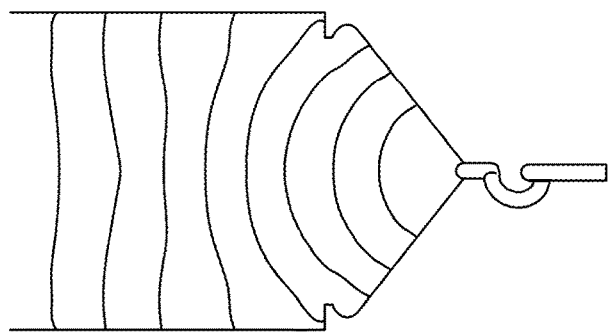
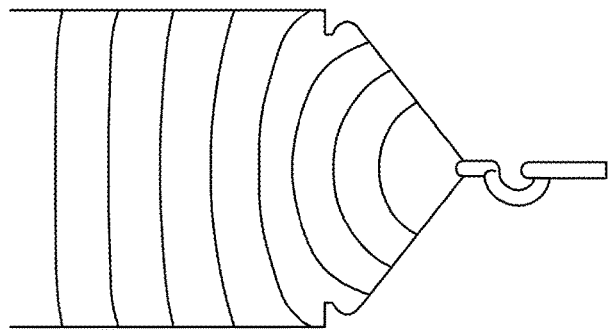
FIG. 11

MOLDING SYSTEM FOR PREPARING FIBER-REINFORCED THERMOPLASTIC COMPOSITE ARTICLE

CROSS-REFERENCE TO RELATED APPLICATION

This patent application claims priority under 35 U.S.C. § 119(e) from Provisional Patent Application No. 62/625,061, filed on Feb. 1, 2018, the disclosure of which is incorporated by reference herein in its entirety, including all exhibits appended to Provisional Patent Application No. 62/625,061.

TECHNICAL FIELD

The present disclosure relates to a molding system for preparing a fiber-reinforced thermoplastic (FRT) composite article, and more particularly, to an injection molding system for preparing an FRT composite article using a computer-aided engineering (CAE) simulation.

DISCUSSION OF THE BACKGROUND

Fiber-reinforced thermoplastic (FRT) composite articles, produced by molding techniques such as injection molding, have assumed great importance in the manufacture of many products due to their specific mechanical properties, including tensile strength, electrical conductivity, and other characteristics. In order to optimize the quality of the FRT composite articles, it is desirable to accurately predict molding phenomena occurring during a molding process. However, despite significant efforts by many researchers, simulations have thus far failed to achieve satisfactory results.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing a fiber-reinforced thermoplastic composite article. The molding system comprises: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine, wherein the anisotropic stress distribution of the composite molding resin is generated based in part on consideration of an integral effect of an elongational viscosity and a shear viscosity of the composite molding material; and a controller coupled to the processing module and configured to control the molding machine with the molding condition using the generated anisotropic viscosity distribution of the composite molding resin to perform an actual molding process for preparing the fiber-reinforced thermoplastic composite article.

In some embodiments, the integral effect is represented by an expression:

$$N_P(\dot{\gamma}) = \frac{\eta_E(\dot{\gamma})}{\eta_S(\dot{\gamma})}$$

where $N_P(\dot{\gamma})$ represents the integral effect, $\eta_E(\dot{\gamma})$ represents the elongational viscosity, and $\eta_S(\dot{\gamma})$ represents the shear viscosity.

In some embodiments, the processing module is further configured to generate the anisotropic stress distribution of the composite molding material based in part on consideration of an anisotropic rotational diffusion effect of the fibers in the composite molding material.

In some embodiments, the anisotropic rotational diffusion effect of the fibers is represented by an expression:

$$D_R = D:A_4:D$$

where $D_R$ represents the anisotropic rotational diffusion effect of the fibers, D represents a rate of deformation of the molding material, and $A_4$ represents an orientation distribution of the fibers.

In some embodiments, the processing module is further configured to generate the anisotropic stress distribution of the composite molding material based in part on consideration of an anisotropic degree of the fibers in the composite molding material.

In some embodiments, the anisotropic degree of the fibers is represented by a ratio of a fiber's shear rate to a resin's shear rate.

In some embodiments, the anisotropic degree of the fibers is represented by an expression:

$$\left(\frac{\dot{\gamma}_F}{\dot{\gamma}_R}\right)^2 = \frac{D:A_4:D}{D:D}$$

where $\dot{\gamma}_F$ represents the fiber's shear rate, $\dot{\gamma}_R$ represents the resin's shear rate, D represents a rate of deformation of the composite molding material, and $A_4$ represents an orientation distribution of the fibers.

In some embodiments, the processing module is configured to generate the anisotropic stress distribution of the composite molding material based on an expression:

$$\tau' = 2\eta'D + 2\eta'\phi N_p(\dot{\gamma})\left(\frac{D:A_4:D}{D:D}\right)D$$

where $\tau'$ represents the anisotropic stress distribution of the molding material, $\eta'$ represents a shear viscosity distribution of the composite molding material, D represents a rate of deformation of the molding material, ø represents a fiber volume fraction, $N_p(\dot{\gamma})$ represents the integral effect, and $A_4$ represents an orientation distribution of the fibers.

In the present disclosure, a model of a stress tensor is proposed for easily obtaining convergent numerical results and successfully simulating anisotropic flow patterns in an injection molding simulation. The ultimate aim of the present disclosure is to apply this model in simulation operations performed in the injection molding system for preparing a complex 3D geometrical FRT composite article.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

FIG. 11 shows the flow-directional fiber orientation component (A11) distribution through the normalized thickness at different values of critical shear rate (CSR) from $\dot{\gamma}_c=1$ s$^{-1}$ to $\dot{\gamma}_c=10$ s$^{-1}$ under the fixed $N_{p0}=700$.

DETAILED DESCRIPTION

Figure 1:
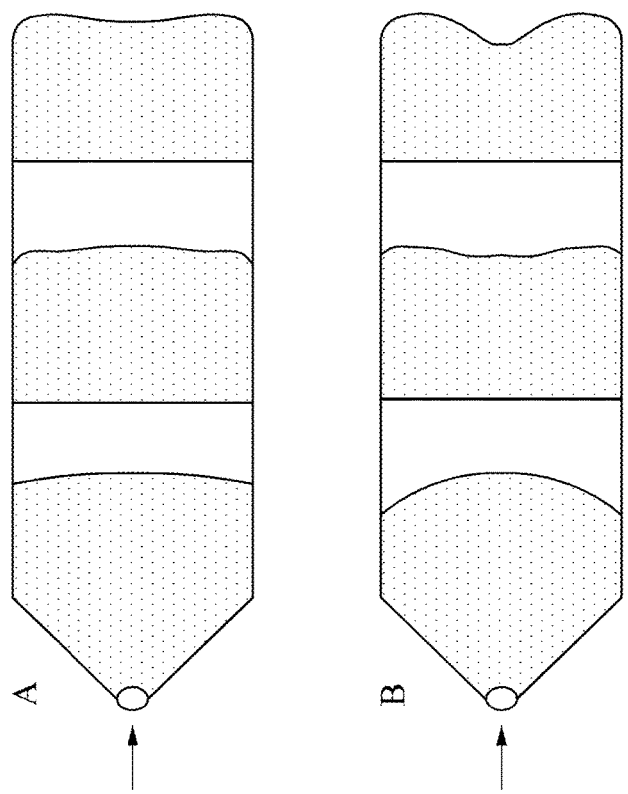
FIG. 1 is a schematic diagram illustrating two different flow patterns during two injection molding processes of a pure resin (A) and a composite molding resin (B).

The following description of the disclosure accompanies drawings, which are incorporated in and constitute a part of this specification, and which illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing a fiber-reinforced thermoplastic (FRT) composite article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

The FRT composite articles, produced by molding techniques such as injection molding, have assumed great importance in the manufacture of many products for their specific mechanical properties, including tensile strength, electrical conductivity, and other beneficial characteristics.

During a typical molding process of FRT composite articles, a composite molding resin, most often in the form of small beads or pellets, is transported to a molding machine that melts the resin beads under heat, pressure, and shear. The molten molding resin is forcibly injected into a mold cavity having a particular cavity shape. The injected molding resin is held under pressure in the mold cavity, cooled, and then removed as a solidified part having a shape that essentially duplicates the shape of the mold cavity.

The mechanical properties of the molded article are correlated with the orientation distribution of the fibers. If the simulated orientation distribution of the fibers having the corresponding mechanical properties does not meet the specification of the molded FRT article, the fiber parameters or the molding condition may be adjusted, and another simulation may be performed to obtain an updated orientation distribution of the fibers in the composite molding resin using the adjusted fiber parameter or the molding condition. In some embodiments, the molding condition includes the mold temperature, resin temperature, injection pressure, injection time (or speed), packing pressure, packing time, or other characteristics.

Studies show that the flow patterns of the composite molding resin are anisotropic and depend significantly on the orientation distribution of the fibers therein. For example, FIG. 1 is a schematic diagram illustrating two different flow patterns during injection molding processes of a pure resin (A) and a composite molding resin (B).

Referring to FIG. 1, during the injection molding process of the pure resin (A), the injection molded melt front is typically smooth and continuous during the propagation of the free surface. In contrast, in the injection molding process of the composite molding resin (B), wherein the composite molding resin includes both short and long FRT composites at high fiber concentrations, the free surface along the sidewalls of the mold cavity advances more quickly than the free surface in the center, and therefore the flow pattern is peculiar and irregular (See, Truckenmüller F, Fritz H-G. Injection molding of long fiber-reinforced thermoplastics: A comparison of extruded and pultruded materials with direct addition of roving strands. Polym Eng Sci 1991; 31 1316-1329; the entirety of the above-mentioned publication is hereby incorporated by reference herein and made a part of this specification).

The skin-shell-core structure is an important fiber orientation distribution through the thickness of a part for injection-molded fiber composites. In particular, a broader core region is obviously induced by the plug flow, while the flow is also influenced by the fiber orientation state. This is known as the flow-fiber coupling relationship. Unfortunately, state-of-the-art predictive engineering tools provide unsatisfactory flow behavior simulations for fiber-composites in injection molding.

The flow patterns of the composite molding resin during a mold filling process play an important role in forming a flow-induced fiber orientation distribution, while the flow patterns are in turn affected by the fiber orientation distribution. Based on classic rheology of semi-concentrated fiber-suspensions of Dihn and Armstrong, Lipscomb et al. developed a constitutive equation of fiber suspensions in which the effect of fiber orientation on flow stress can be modeled (See, Dinh S M, Armstrong R C. A rheological equation of state for semiconcentrated fiber suspensions. J Rheol 1984; 28 207-227; Lipscomb II G G, Denn M M, Hur D U, Boger D V. The flow of fiber suspensions in complex geometries. J Non-Newtonian Fluid Mech 1988; 26 297-325; Wang J, O'Gara J F, Tucker III C L. An objective model for slow orientation kinetics in concentrated fiber suspensions: Theory and rheological evidence. J Rheol 2008; 52(5) 1179-1200; the entireties of the above-mentioned publications are hereby incorporated by reference herein and made a part of this specification).

The Lipscomb equation provides:

$$\tau = 2\eta_m D + 2\eta_m N_p D:A_4 \quad (1)$$

where $\eta_m$ is the matrix (solvent or neat polymer melts) viscosity in the absence of fibers, as the linear Newtonian viscous fluids; D is the rate-of-deformation tensor; $A_4$ is the fourth-order orientation tensor; and $D: A_4$ is called the Dihn-Armstrong coupling term. In general, Eq. (1) is called "the Lipscomb constitutive equation of flow-fiber coupling," where the particle number $N_p$ is a constant parameter.

Extensive efforts have been made by many researchers to couple the flow field and fiber orientation calculations based on the Lipscomb constitutive equation (See, Chung S T, Kwon T H. Coupled analysis of injection molding filling and fiber orientation including in-plane velocity gradient effect. Polym Compos 1996; 17 859-872; VerWeyst B E, Tucker III C L. Fiber suspensions in complex geometries: Flow/orientation coupling. Can J Chem Eng 2002; 80(6) 1093-1106; Mazahir S M, Vélez-García G M, Wapperom P, Baird D G. Evolution of fiber orientation in radial direction in a center-gated disk: Experiments and simulation. Compos Pt A-Appl Sci Manuf 2013; 51 108-117; Tang L, Altan M C. Entry flow of fiber suspensions in a straight channel. J Non-Newtonian Fluid Mech 1995; 56 183-216; the entireties of the above-mentioned publications are hereby incorporated by reference herein and made a part of this specification). However, numerically stable and convergent numerical results were not obtained to simulate anisotropic flow and predict accurate fiber orientation when giving larger $N_p$ values. Thus, the fiber orientation tensor component distributions were independent of the particle number $N_p$, while the velocity profile varied only slightly. So far, coupling can be neglected in injection molding simulation for existing software.

Based on the Lipscomb constitutive equation, Li and Luyé recently developed the so-called optimal approximate scalar viscosity model of the 4th-order viscosity tensor (See, Li T, Luyé J-F. Flow-fiber coupled viscosity in injection molding simulations of short fiber reinforced thermoplastics. Int Polym Process 2018; In press (https://www.researchgate.net/publication/322438226_Flow-fiber_coupled_viscosity_in_injection_molding_simulations_of_short_fiber_reinforced_thermoplastics; the entirety of the above-mentioned publication is hereby incorporated by reference herein and made a part of this specification)), $$\eta^* = \eta_m\left(1 + N_p \frac{D:A_4:D}{D:D}\right) \quad (2)$$

$$\tau = 2\eta^* D \quad (3)$$

$$\tau = 2\eta_m D + 2\eta_m N_p \frac{D:A_4:D}{2D:D} D \quad (4)$$

Figure 2:
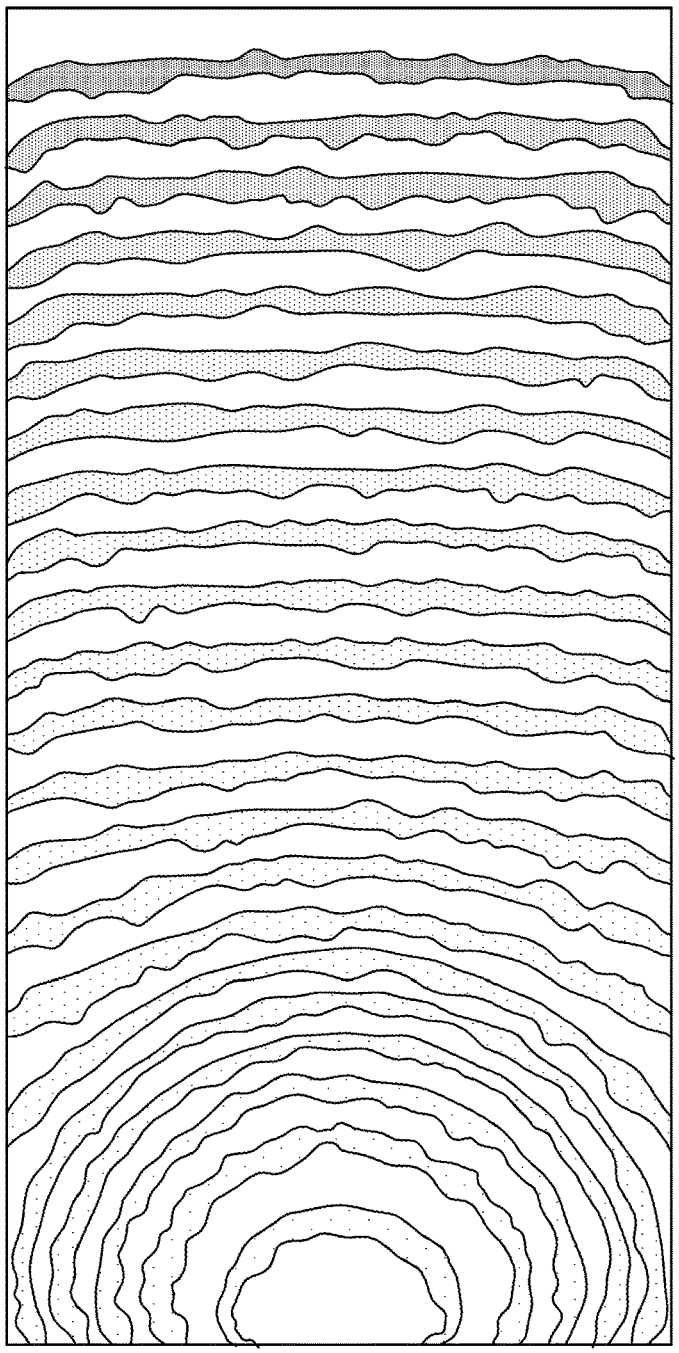
FIG. 2 shows the filling contour of the injection simulation for the alternative Lipscomb equation of coupled flow and fiber.

Thus, Eq. (4) is similar to the Lipscomb equation, and is known as "the alternative Lipscomb equation." Through injection molding simulations made using Autodesk Moldflow, Li and Luyé validate the alternative Lipscomb equation to investigate the effect of fiber-induced viscosity on flow pattern prediction for the 50% wt short fiber filled polyamide. However, the alternative Lipscomb equation of coupled flow and fiber is not able to predict a locally concave contour in which the flow advances faster near the edge than in the center, as shown in FIG. 2.

Figure 3:
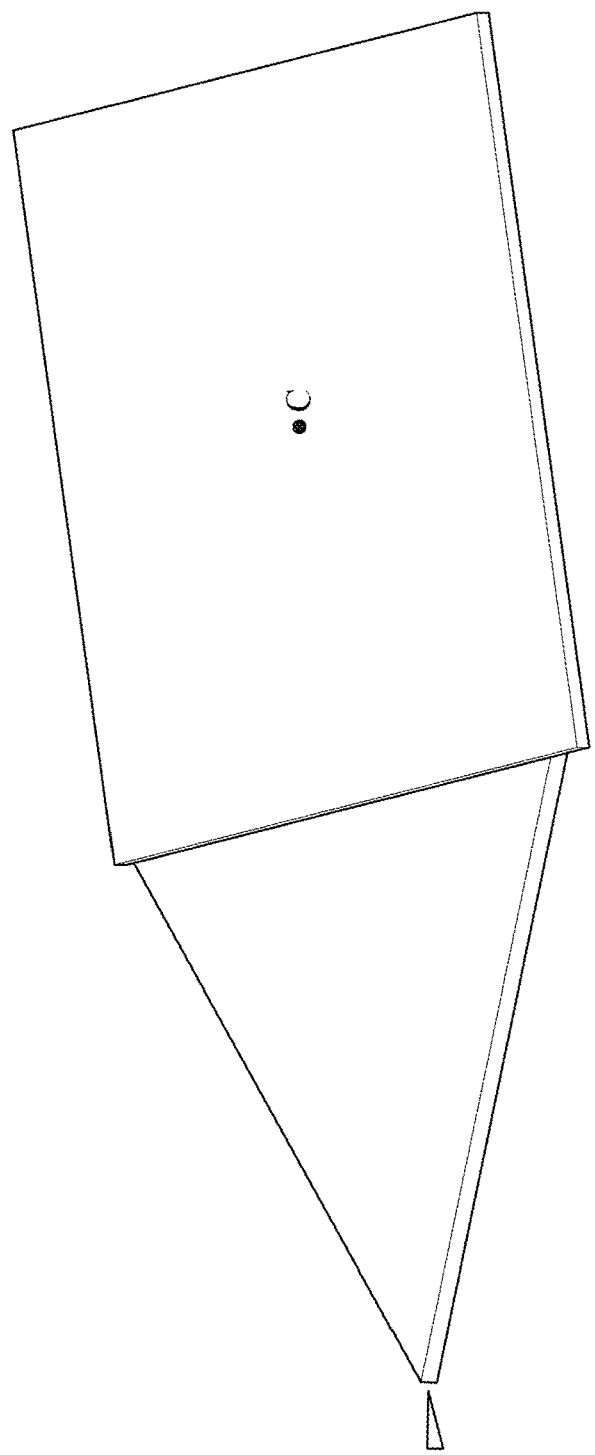
FIG. 3 shows the geometry of the fan-gated rectangular plate with one probe point C located at the center.
Figure 4:
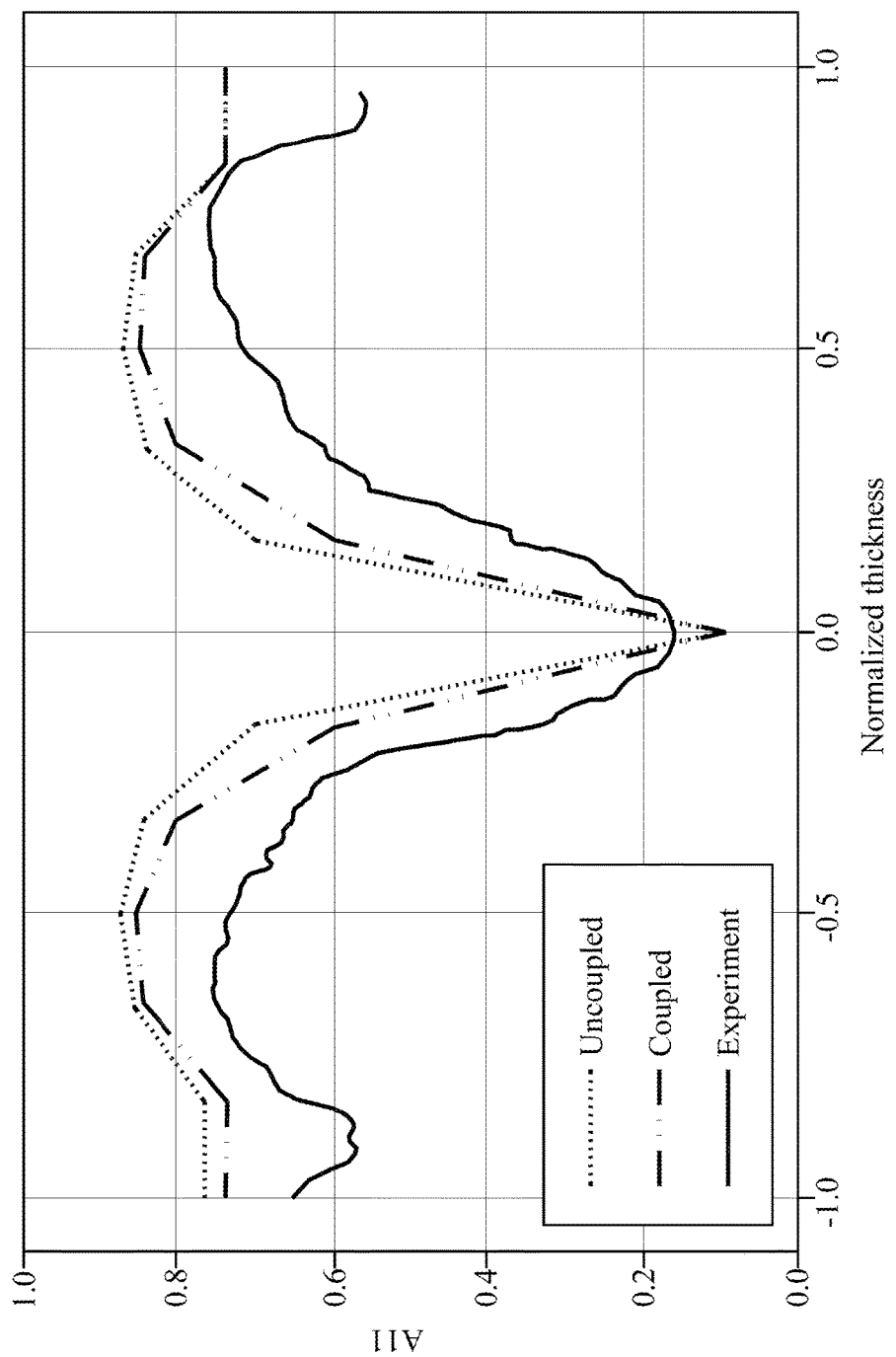
FIG. 4 shows the fiber orientation (flow-directional fiber orientation component, A11) distribution for a comparison of the uncoupled/coupled simulations and experimental data through the normalized thickness at the probe point C in FIG. 3.

For a fan-gated rectangular plate with one probe point located at the center (the probe point C in FIG. 3), Li and Luyé indicated the coupling effect on the core width of the fiber orientation distribution prediction is larger than the uncoupling result (FIG. 4). However, the Li-Luyé model fails to predict anisotropic flow pattern and accurate fiber orientation, as compared with experimental data.

More recently, Favaloro et al. considered the fourth-order viscosity tensor constitutive equation of $\tau=\eta_4:D$ to derive an informed isotropic (IISO) viscosity $\eta^{IISO}$ (See, Favaloro A J. Rheological behavior and manufacturing simulation of prepreg platelet molding systems. Ph.D. Thesis, Purdue University; 2017; Favaloro A J, Pipes R B, Tseng H-C. A New Anisotropic Viscous Constitutive Model for Composites Molding Simulation. Composites Part A: Applied Science and Manufacturing 2018; 115 112-122; the entireties of the above-mentioned publications are hereby incorporated by reference herein and made a part of this specification):

$$\tau = 2\eta^{IISO} D \quad (5)$$

$$\eta^{IISO} = \frac{D:\eta_4:D}{2D:D} \quad (6)$$

In addition, the fourth-order viscosity tensor $\eta_4=[\eta_{ijkl}]$ is described by Tucker Advani and Tucker (See, Advani S G, Tucker III CL. Closure approximations for three-dimensional structure tensors. J Rheol 1990; 34 367-386; Advani S G, Tucker III C L. The use of tensors to describe and predict fiber orientation in short fiber composites. J Rheol 1987; 31(8) 751-784; the entireties of the above-mentioned publications are hereby incorporated by reference herein and made a part of this specification).

$$\eta_{ijkl} = \quad (7)$$
$$H_1 A_{ijkl} + H_2(A_{ij}\delta_{kl} + A_{kl}\delta_{ij}) + H_3(A_{ik}\delta_{jl} + A_{il}\delta_{jk} + A_{jl}\delta_{ik} + A_{jk}\delta_{il}) +$$
$$H_4 \delta_{ij}\delta_{kl} + H_5(\delta_{ik}\delta_{jl} + \delta_{il}\delta_{jk})$$

rials. In: Advani SG, editor. Flow and rheology in polymer composites manufacturing. Amsterdam: Elsevier, 1994. p. 85-125; the entirety of the above-mentioned publication is hereby incorporated by reference herein and made a part of this specification), there are theoretical extension and shear viscosities of including Newtonian, Power-law, and Carreau model developments in "hyper-concentrated suspensions" with large fiber aspect ratio (L/D), as shown in Table 1 (the theoretical viscosities of hyper-concentrated suspensions for the Newtonian, Power-law, and Carreau models). Note that κ is the volume fraction parameter.

| Term | Newtonian | Power law | Carreau |
|---|---|---|---|
| $\eta_{11}$ | $\dfrac{\eta f}{2}[\kappa - 1]$ $\times (L/D)^2$ | $2^{-n} \eta f[\kappa - 1]^n$ $\times (L/D)^{n+1}(\dot{\varepsilon}_{11})^{n-1}$ | $\dfrac{\eta_0 A_T(\kappa - 1)f}{2}(L/D)^2$ $\times \left[1 + \dfrac{A_T^2(\kappa - 1)^2(L/D)^2}{4}(\lambda \dot{\varepsilon}_{11})^2\right]^{(n-1)/2}$ |
| $\eta_{12}$ | $\kappa\eta$ | $\eta\kappa^n(\dot{\gamma}_{12})^{n-1}$ | $\eta_0 A_T \kappa[1 + (A_T \lambda \kappa)^2(\dot{\gamma}_{12})^2]^{(n-1)/2}$ |

-continued $$H_1 = \eta_{11} - 4\eta_{12} + \eta_{23} \quad (8)$$

$$H_2 = -\frac{1}{3}\eta_{11} + \eta_{23} \quad (9)$$

$$H_3 = \eta_{12} - \eta_{23} \quad (10)$$

$$H_4 = \frac{1}{9}\eta_{11} - \eta_{23} \quad (11)$$

$$H_5 = \eta_{23} \quad (12)$$

where a direct analogy to the elastic stiffness which for transversely isotropic fluids expresses: $\eta_{11}$ as the extensional viscosity in the fiber direction, $\eta_{12}$ as the in-plane shearing viscosity and $\eta_{23}$ as the transverse shearing viscosity. In general, $\eta_{12}=\eta_{23}$ is assumed.

Thus, the Advani-Tucker fourth-order viscosity tensor above is inserted to the informed isotropic (IISO) viscosity of Eq. (6). We can derive to obtain a similar Li-Luyé optimal approximate scalar viscosity of Eq. (2), as below:

$$\eta^{IISO} = \eta_{12} + (\eta_{11} - 3\eta_{12})\frac{D:A_4:D}{2D:D} \quad (13)$$

$$= \eta_{12}\left[1 + \left(\frac{\eta_{11}}{\eta_{12}} - 3\right)\frac{D:A_4:D}{2D:D}\right] \quad (14)$$

In conclusion, the informed isotropic (IISO) viscosity of Eq. (6) is the general scalar definition of the anisotropic viscosity tensor, while the Li-Luyé optimal approximate scalar viscosity is one special form of the informed isotropic (IISO) viscosity of Eq. (2).

For the Advani-Tucker fourth-order viscosity tensor, the viscosity variables $\eta_{ij}$ represent the suspension viscosity blended with fibers or the mixing fiber-matrix viscosity generated in the homogeneous flow fields due to the presence of fibers. For the fourth-order viscosity tensor, the parameters H1-H5 are related to shear viscosities and extension viscosities. According to Pipes et al. (See, Pipes R B, Coffin D W, Simacek P, Shuler S R, Okine R K. Rheological behavior of collimated fiber thermoplastic composite mate- The effective anisotropic viscosities are described by the Carreau model (FIG. 5) with respect to respective strain rates for the 25 vol. % long glass fibers filled into polypropylene (PP) at 200° C., wherein the aspect ratio L/D=360 and the parameter K=2.19.

Figure 5:
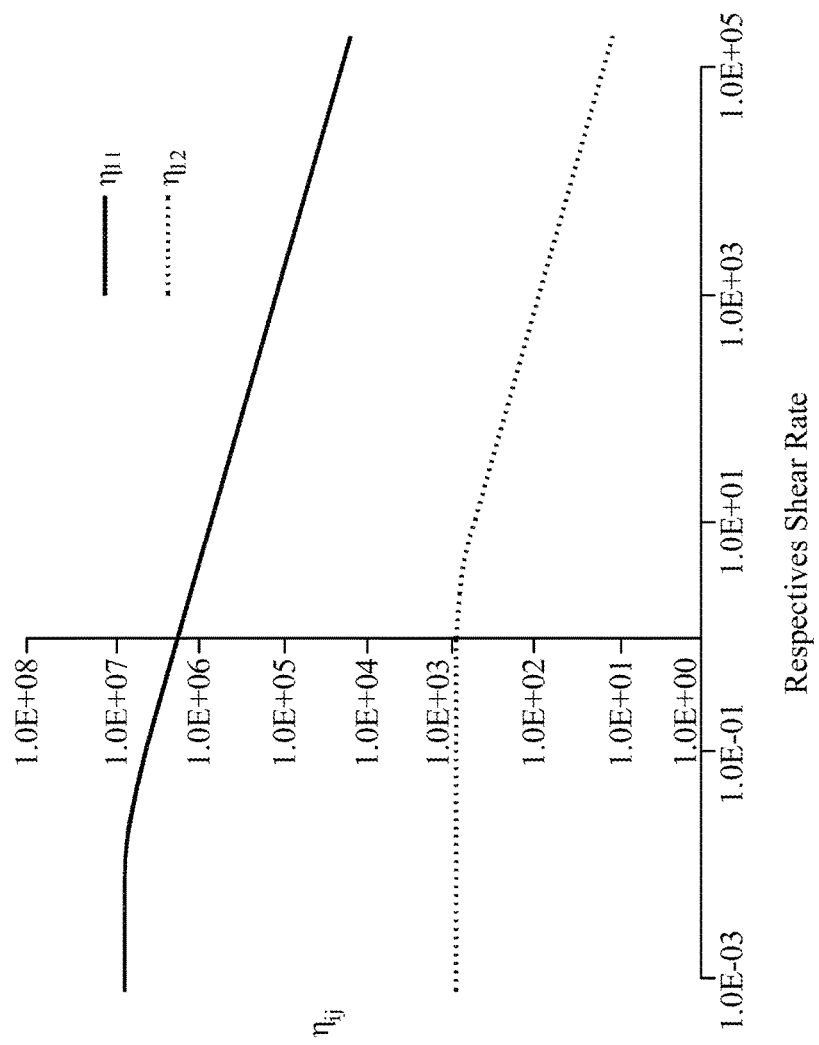
FIG. 5 shows the effective viscosities of the fiber/matrix suspension for the Carreau viscosity model.

According to FIG. 5 and the related literature of experimental measurement (See, Thomasset J, Carreau P J, Sanschagrin B, Ausias G. Rheological properties of long glass fiber filled polypropylene. J Non-Newtonian Fluid Mech 2005; 125 25-34; the entirety of the above-mentioned publication is hereby incorporated by reference herein and made a part of this specification), the elongational viscosity $\eta_{11}$ is greater than the shear viscosity $\eta_{12}$, i.e., $\eta_{11} \gg \eta_{12}$, so Eq. (14) can be simply obtained:

$$\eta^{IISO} = \eta_{12}\left[1 + \frac{\eta_{11}}{\eta_{12}}\frac{D:A_4:D}{2D:D}\right] \quad (15)$$

While the shear viscosity and the elongational viscosity of the mixing fiber-matrix viscosity generated in the homogeneous flow fields due to the presence of fibers are given as non-linear shear-rate dependent Newtonian viscous fluids, $\eta_{12}=\eta_S(\dot{\gamma})$ and $\eta_{11}=\eta_E(\dot{\gamma})$, and the flow-fiber coupling parameter can be expressed as follows:

$$N_P = \frac{\eta_E(\dot{\gamma})}{\eta_S(\dot{\gamma})} \quad (16)$$

Figure 6:
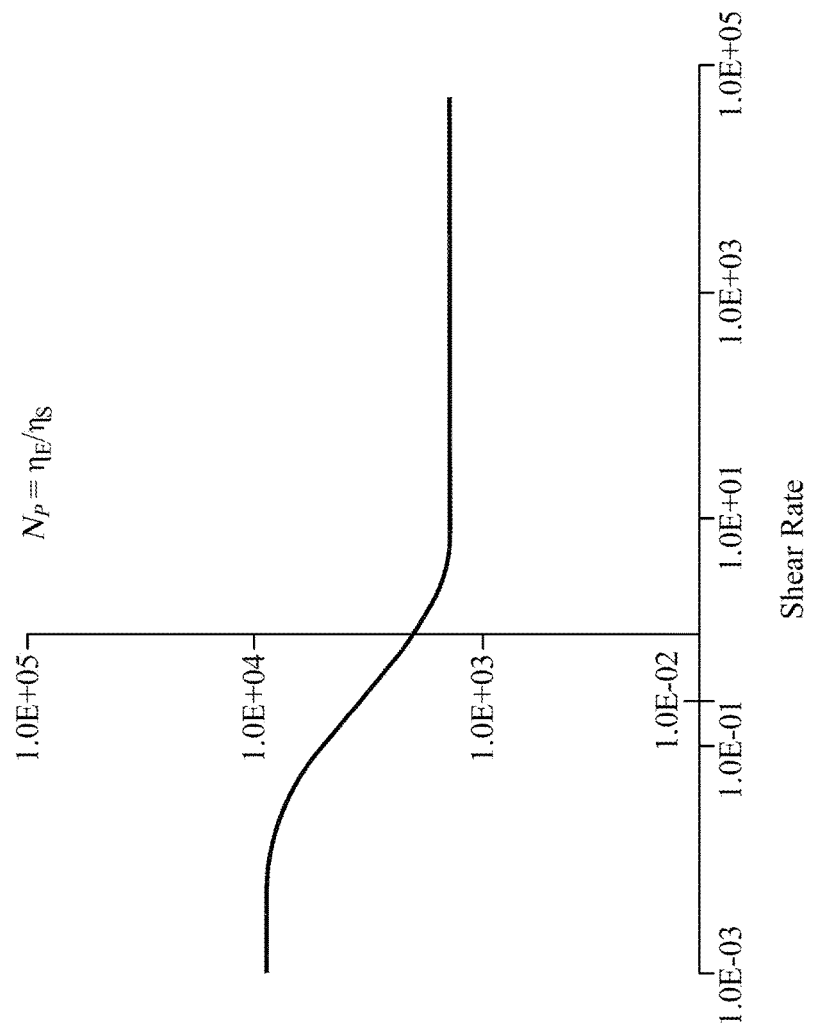
FIG. 6 shows the variation of the ratio of elongational viscosity to shear viscosity with respect to the strain rate in accordance with some embodiments of the present disclosure.

Thus, the ratio of the elongational viscosity to the shear viscosity is shown in FIG. 6, wherein the parameter $N_P$ is a function of shear rate, and is not the constant. The measurements of the elongational viscosity and the shear viscosity are well known in the art (See, J. Thomasset et al./J. Non-Newtonian Fluid Mech. 125 (2005) 25-34; the entirety of the above-mentioned publication is hereby incorporated by reference herein and made a part of this specification).

$$\eta^{IISO} = \eta_S(\dot{\gamma})\left[1 + N_P(\dot{\gamma})\frac{D:A_4:D}{2D:D}\right] \quad (17)$$

In addition, Eq. (17) is inserted to Eq. (5), $$\tau = 2\eta_S(\dot{\gamma})D + 2\eta_S(\dot{\gamma})N_P(\dot{\gamma})\frac{D:A_4:D}{2D:D}D \quad (18)$$

Based on FIG. 6, we can find the general complete form of the shear-rate dependent $N_p$ variable, as below:

$$N_P(\dot{\gamma}) = N_p^\infty - \frac{N_p^o - N_p^\infty}{1+(\dot{\gamma}/\dot{\gamma}_C)^n} \quad (19)$$

where $N_p^0$, $N_p^\infty$, $\dot{\gamma}_C$, and n are the given parameters. In addition, we can provide a simple available form:

$$N_P(\dot{\gamma}) = \frac{N_p^o}{1+(\dot{\gamma}/\dot{\gamma}_C)^2} \quad (20)$$

Figure 7:
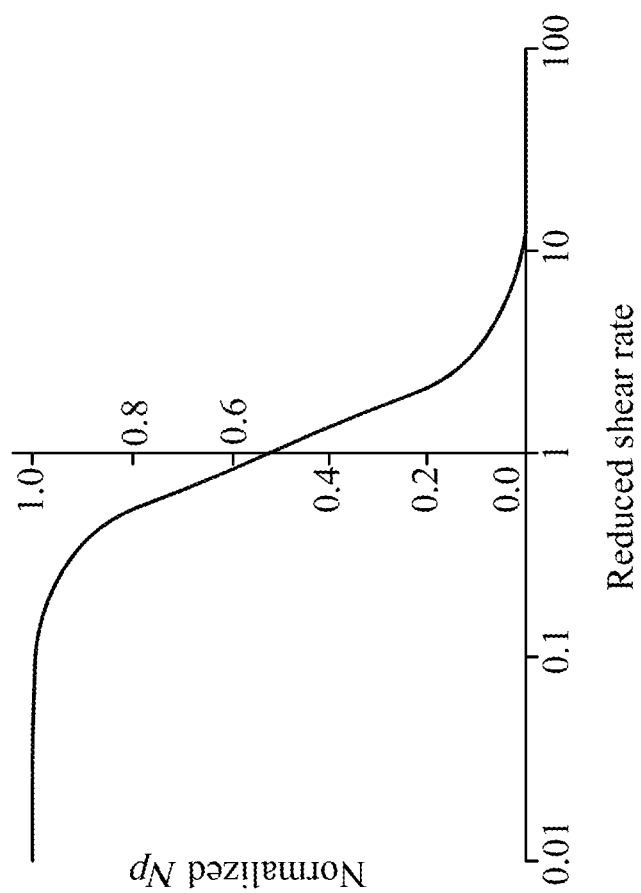
FIG. 7 shows the normalized $N_p$ variable $(N_p/N_p^0)$ plotted against the reduced shear rate $(\dot{\gamma}/\dot{\gamma}_C)$ in accordance with some embodiments of the present disclosure.

The normalized $N_p$ $$\left(\frac{N_P(\dot{\gamma})}{N_{P0}}\right)$$

against the reduced strain rate ($\dot{\gamma}/\dot{\gamma}_c$) is plotted in FIG. 7.

In the past, the flow-fiber coupling parameter $N_p$ was constant. In the present invention, we propose the shear-rate dependent $N_p$ parameter to improve the alternative Lipscomb equation of flow-fiber coupling, as below:

$$\tau = 2\eta_S(\dot{\gamma})D + 2\eta_S(\dot{\gamma})N_P(\dot{\gamma})\frac{D:A_4:D}{2D:D}D \quad (21)$$

$$N_P(\dot{\gamma}) = \frac{\eta_E(\dot{\gamma})}{\eta_S(\dot{\gamma})} \quad (22)$$

Thus, the present invention is validated to not only simulate a concave contour in which the flow advances faster near the edge than in the center for injection molding, but also predict accurate fiber orientation distribution of the shell-core structure.

Figure 8:
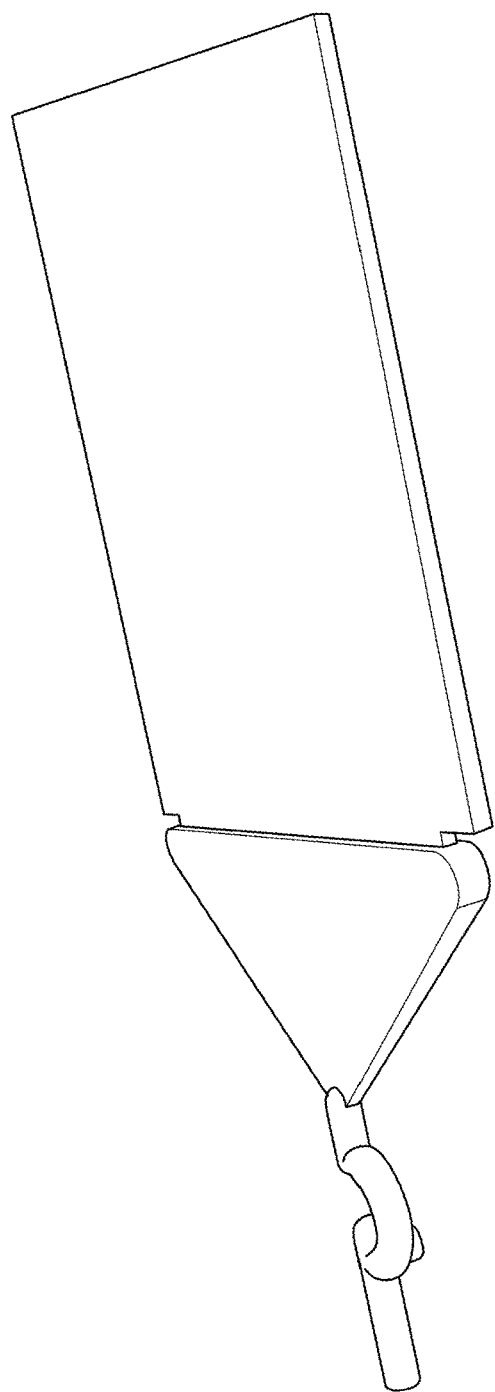
FIG. 8 shows the geometry of an injection molded plate in accordance with some embodiments of the present disclosure.

Based on the previous study of Tseng et al. (See, Tseng H-C, Chang R-Y, Hsu C-H. Numerical predictions of fiber orientation for injection molded rectangle plate and tensile bar with experimental validations. Int Polym Process 2018; 33 96-105; the entirety of the above-mentioned publication is hereby incorporated by reference herein and made a part of this specification), the used material was 35 wt % short glass fiber-reinforced Polyamide66. The geometry of injection molding parts was designed as a 150×150×3 mm³ plate, as shown in FIG. 8. In the plate, one central location of the gap-wise fiber orientation distribution across the thickness was measured. Herein, we adopted the commercial injection molding simulation software, Moldex3D, to perform the 3D injection molding simulation and fiber orientation predictions. In Moldex3D, the fiber orientation model is the iARD-RPR model (See, Tseng H-C, Chang R-Y, Hsu C-H. An objective tensor to predict anisotropic fiber orientation in concentrated suspensions. J Rheol 2016; 60(2) 215-224; the entirety of the above-mentioned publication is hereby incorporated by reference herein and made a part of this specification). In particular, the alternative Lipscomb equation of flow-fiber coupling with the present invention of the shear-rate dependent $N_p$ parameter has been implemented in the research version of Moldex3D. Thus, the present invention is validated to not only simulate a concave contour in which the flow advances faster near the edge than in the center for injection molding, but also predict accurate fiber orientation distribution of the shell-core structure.

Figure 9:
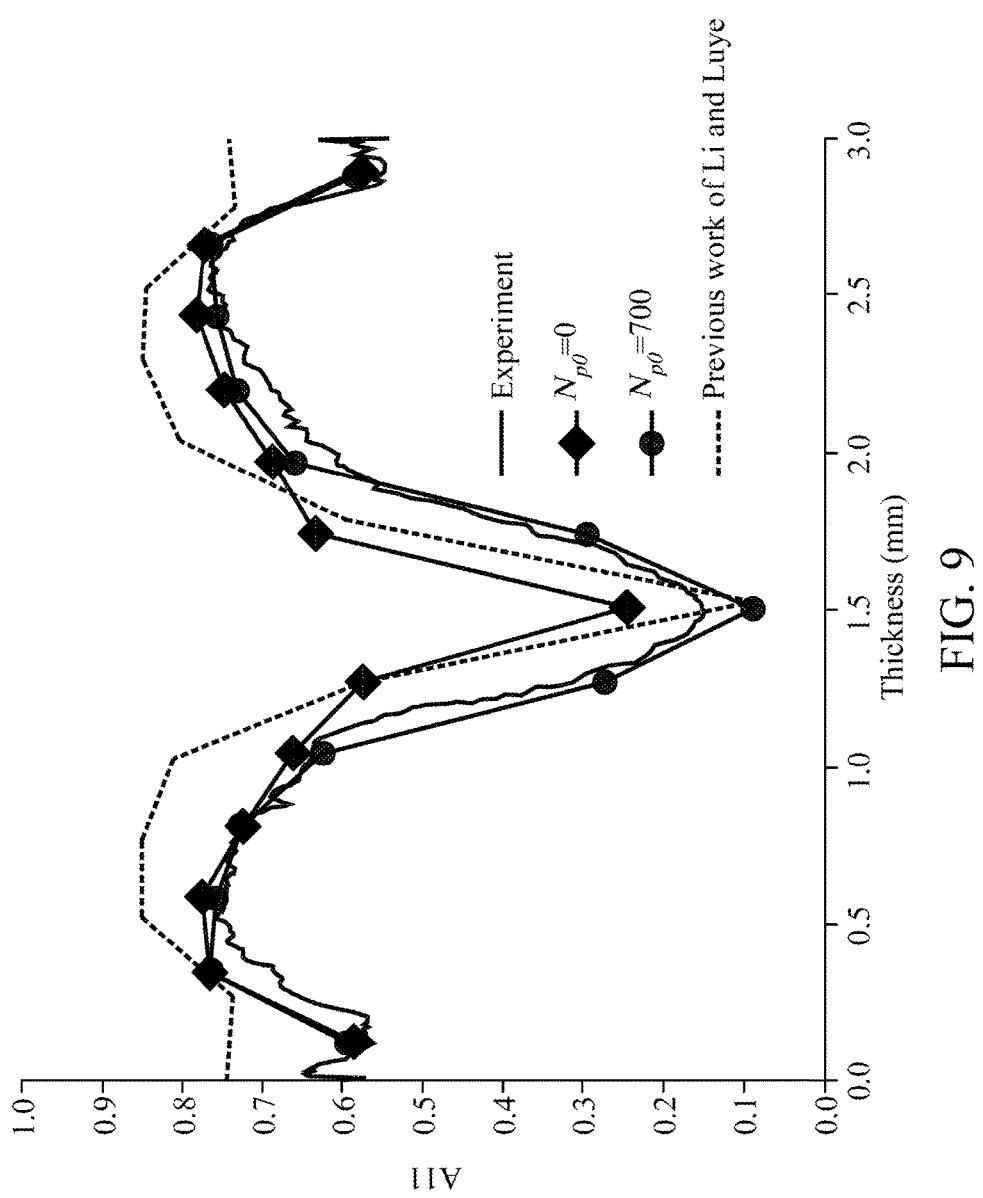
FIG. 9 shows the flow-directional fiber orientation component (A11) distribution through the normalized thickness at different values of parameter $N_{p0}$ from 0 to 700 under the fixed critical shear rate (CSR), $\dot{\gamma}=10$ s$^{-1}$.
Figure 10:
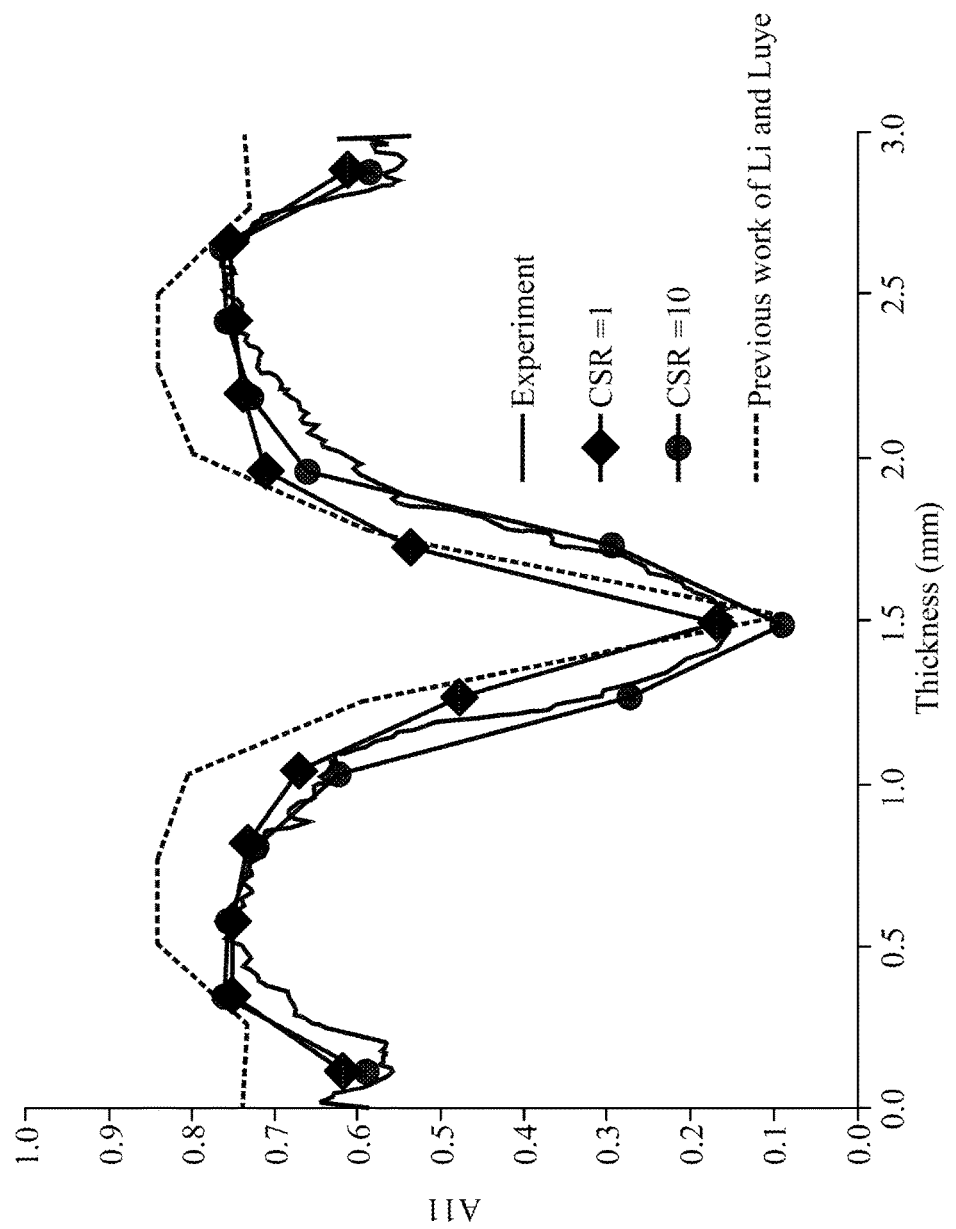
FIG. 10 shows predicted melt fronts of the filled end-gated plate at different values of critical shear rate from $\dot{\gamma}_c=1$ s$^{-1}$ to $\dot{\gamma}_c=10$ s$^{-1}$ under the fixed $N_{p0}=700$.

FIG. 9 shows the flow-directional fiber orientation component A11 distribution through the normalized thickness at two different values, $N_{p0}$=0 and 700, under the fixed critical shear rate (CSR), $\dot{\gamma}_c$=10 s$^{-1}$. As can be seen, the core width is increased with $N_{p0}$. In some embodiments of the present disclosure, based on the excellent tools, including 3D flow simulation, fiber orientation prediction, and flow-fiber coupling calculation, our prediction is in good agreement with experimental data, and superior to the previous work of Li and Luyé. In FIG. 10, the core width is increased with critical shear rate from $\dot{\gamma}_c$=1 s$^{-1}$ to $\dot{\gamma}_c$=10 s$^{-1}$, when the parameter $N_{p0}$ is fixed, $N_{p0}$=700. FIG. 11 shows the predicted melt fronts of the filled end-gated plate at different values of critical shear rate. As a result, the concave contour occurs in high critical shear rates, and no concave contour occurs at low critical shear rates. Thus, the critical shear rate serves to control concave contour of the melt front for injection molded fiber composites. The core width can be changed by increasing values of the parameters $N_{p0}$ and critical shear rate.

Therefore, one objective of the present disclosure is to propose a modification to the Lipscomb equation for the coupling flow-fiber calculation. Accordingly, this disclosure next seeks to explain why divergent numerical calculation results are produced when using large $N_p$ values.

Another objective of the present disclosure is to provide a molding system for preparing a fiber-reinforced thermoplastic (FRT) composite article using a computer-aided engineering (CAE) simulation with a modified Lipscomb equation.

The present disclosure proposes a modified Lipscomb equation to describe the anisotropic stress distribution of the composite molding resin. The modified Lipscomb equation can be used to obtain convergent numerical calculation results even with large $N_p$ values and can therefore be used to successfully simulate anisotropic flow patterns of the composite molding material. As stated above, one objective of the present disclosure is to apply the modified Lipscomb equation in an injection molding system for preparing an FRT composite article.

One objective of the present disclosure is to apply the modified Lipscomb equation in injection molding simulation operations performed in an injection molding system for preparing a complex 3D geometrical FRT composite article.

Figure 12:
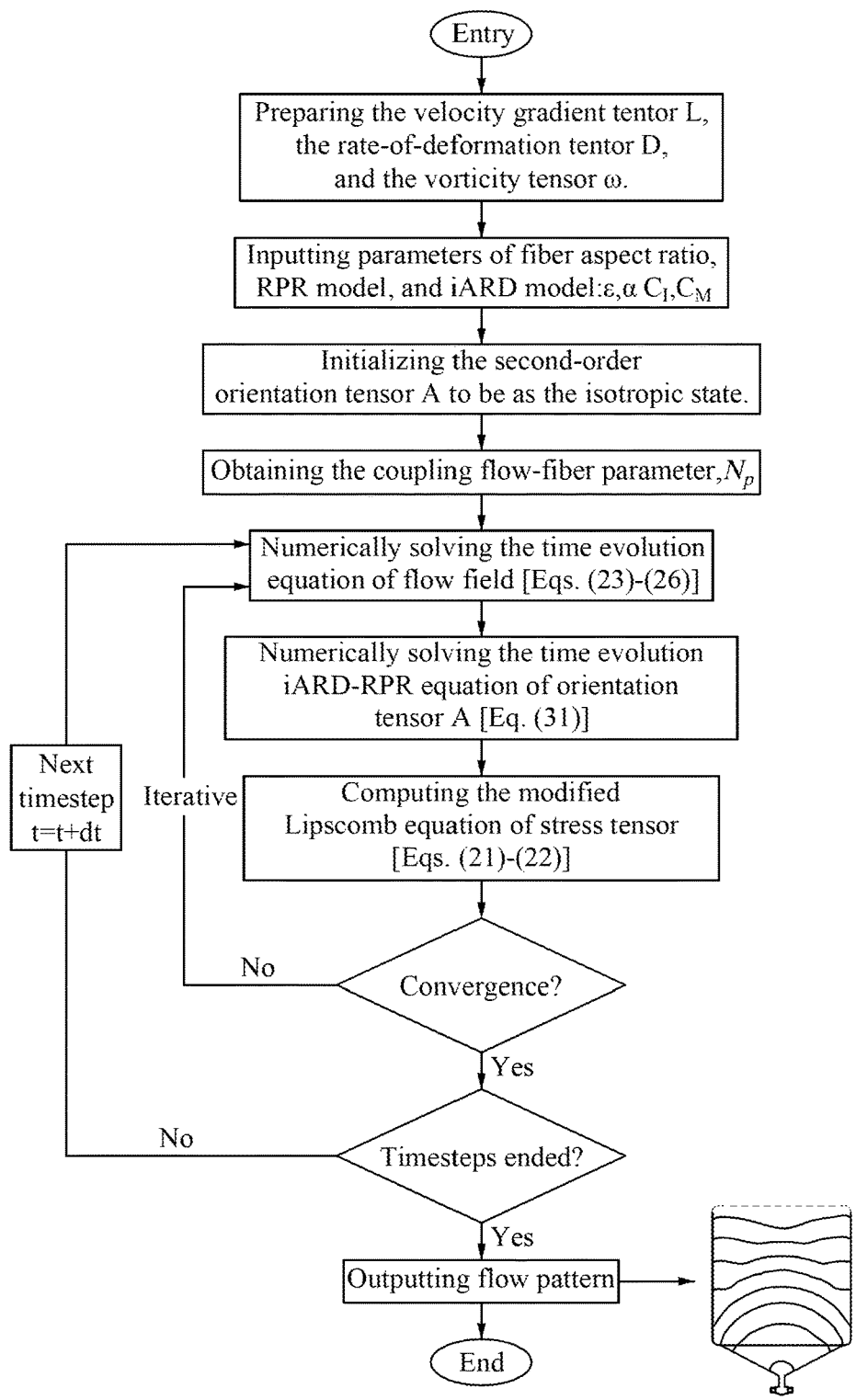
FIG. 12 is a flowchart showing an integration of a modified Lipscomb equation and CAE simulation software in accordance with some embodiments of the present disclosure.

FIG. 12 is a flowchart showing an integration of the modified Lipscomb equation and CAE simulation software in accordance with some embodiments of the present disclosure. As shown in FIG. 12, the CAE simulation software can compute the stress tensor τ by applying the modified Lipscomb equation for the subsequent fiber orientation distribution analysis. In addition, after computing the stress tensor τ, if the numerical calculation results are not convergent, the fiber parameters or the molding conditions may be adjusted, and another simulation can be performed to obtain updated calculation results. By applying the modified Lipscomb equation, the orientation distribution of the fibers can be accurately predicted.

Still referring to FIG. 12, in injection molding simulation operations, the governing equations of the fluid mechanics which describe the transient flow motions are as follows:

$$\frac{\partial \rho}{\partial t} + \nabla \cdot \rho u = 0 \tag{23}$$

$$\frac{\partial}{\partial t}(\rho u) + \nabla \cdot (\rho u u - \sigma) = \nabla \cdot \sigma + \rho g \tag{24}$$

$$\sigma = -pI + \tau \tag{25}$$

$$\rho C_P \left[ \frac{\partial T}{\partial t} + u \cdot \nabla T \right] = \nabla \cdot (k \nabla T) + \eta \dot{\gamma}^2 \tag{26}$$

Where $\rho$ is density, t is time, u is velocity vector, $\sigma$ and $\tau$ are total stress tensor and deviatoric stress tensor, respectively, g is acceleration vector of gravity, p is pressure, $\eta$ is isotropic viscosity, $C_P$ is specific heat, T is temperature, k is thermal conductivity, and $\dot{\gamma}$ is shear rate.

Solving the governing equations (23)-(26) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are not zero; i.e., the partial derivatives $$\frac{\partial \rho}{\partial t} + \nabla \cdot \rho u = 0 \tag{23}$$

$$\frac{\partial}{\partial t}(\rho u) + \nabla \cdot (\rho u u - \sigma) = \nabla \cdot \sigma + \rho g \tag{24}$$

$$\sigma = -pI + \tau \tag{25}$$

$$\rho C_P \left[ \frac{\partial T}{\partial t} + u \cdot \nabla T \right] = \nabla \cdot (k \nabla T) + \eta \dot{\gamma}^2 \tag{26}$$

in the governing equations (23)-(26) are not considered zero.

The true 3D Finite Volume Method (FVM) is employed due to its robustness and efficiency to solve the transient flow fields in a complex 3D geometrical FRT composite article. In some embodiments of the present disclosure, a modified Lipscomb equation can be implemented in a commercial injection molding simulation software, Moldex3D (CoreTech System Co. of Taiwan), to facilitate the fiber orientation predictions.

The flow curves of shear viscosity dominate the flow behaviors for a variety of materials. Commonly, the Cross-William-Landel-Ferry (Cross-WLF) model (See, Cross (1979). Relation between viscoelasticity and shear-thinning behavior in liquids. *Rheology Acta,* 18(5), 609-614; the entirety of the above-mentioned publication is hereby incorporated by reference herein and made a part of this specification) used in polymer rheology and processing can describe complex viscosity behaviors, including the viscosity $\eta(\dot{\gamma},T,P)$ varying with shear rate $\dot{\gamma}$ for the Cross model and the zero-shear-rate viscosity $\eta_0(T,P)$ depending on temperature T and pressure P for the WLF model, as follows:

$$\eta(\dot{\gamma}, T, P) = \frac{\eta_0(T, P)}{1 + \left(\frac{\eta_0 \dot{\gamma}}{\tau^*}\right)^{1-n}} \tag{27}$$

$$\eta_0(T, P) = D_1 \exp\left[\frac{-A_1(T - T_C)}{A_2 + (T - T_C)}\right] \tag{28}$$

$$T_C = D_2 + D_3 P \tag{29}$$

$$A_2 = \tilde{A}_2 + D_3 P \tag{30}$$

where seven parameters are set by related experimental data, including n, $\tau^*$, $\tilde{A}_2$, $A_2$, $D_1$, $D_2$ and $D_3$.

Recently, Tseng et al. developed a new fiber orientation model to couple with Jeffery's hydrodynamic (HD) model, namely, the iARD-RPR model (known as the Improved Anisotropic Rotary Diffusion model combined with the Retarding Principal Rate model) with three parameters, $$\dot{A} = \dot{A}_{HD} + \dot{A}_{iARD}(C_I, C_M) + \dot{A}_{RPR}(\alpha) \tag{31}$$

where $\dot{A}$ represents the material derivative of the tensor A. Parameters $C_I$ and $C_M$ describe the fiber-fiber interaction and fiber-matrix interaction, while parameter a can slow a response of the fiber orientation (See, U.S. Pat. No. 9,862, 133 B1; the entirety of the above-mentioned publication is hereby incorporated by reference herein and made a part of this specification).

Figure 13:
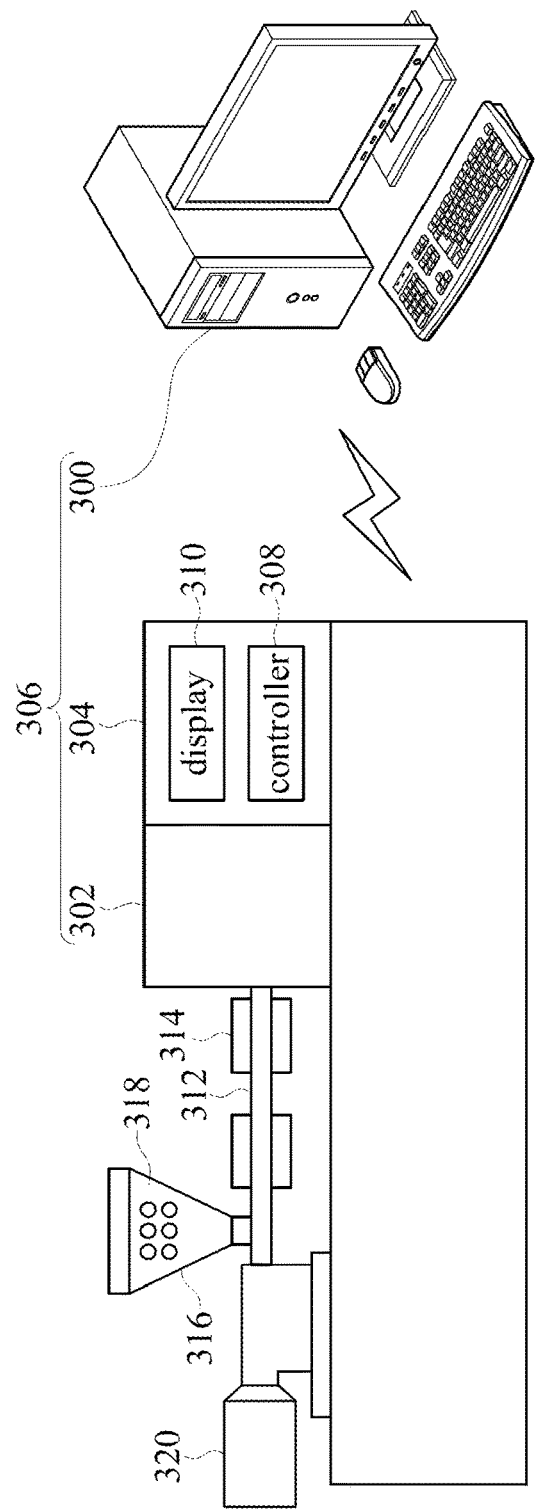
FIG. 13 is a schematic view of an injection molding system in accordance with various embodiments of the present disclosure.
Figure 14:
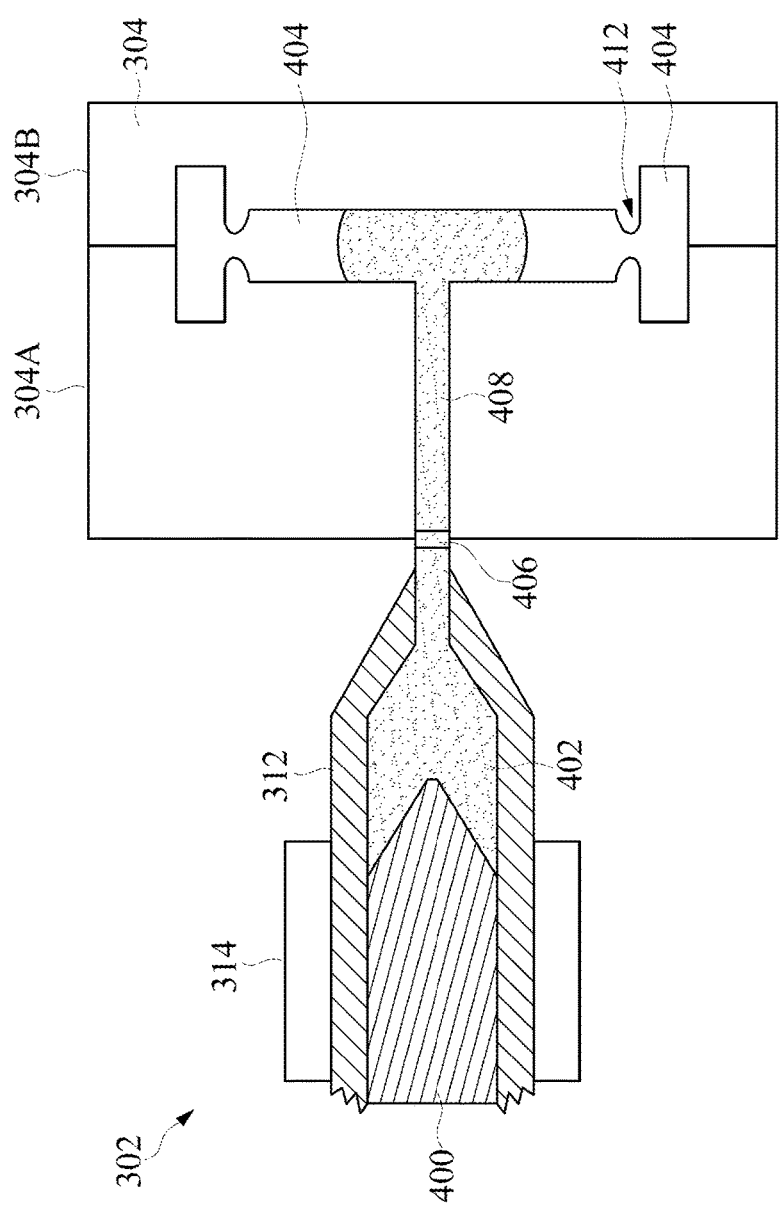
FIG. 14 is a close-up schematic view of a portion of a mold in FIG. 13 in accordance with some embodiments of the present disclosure.

Referring to FIGS. 13 and 14, FIG. 13 is a schematic view of an injection molding system 306 in accordance with various embodiments of the present disclosure. FIG. 14 is a close-up schematic view of a portion of the mold 304 in FIG. 13 in accordance with some embodiments of the present disclosure.

Referring to FIG. 13, the injection molding system 306 comprises an injection molding machine 302, a mold 304 disposed on the injection molding machine 302, and a computing apparatus 300 connected to the injection molding machine 302.

In some embodiments of the present disclosure, the injection molding system 306 further comprises a controller 308 connected to the computing apparatus 300 and configured to control the operation of the injection molding machine 302. In some embodiments of the present disclosure, the injection molding system 306 further comprises a display 310 configured to visually represent information of an injection molding process, such as simulation molding results.

In some embodiments of the present disclosure, the computing apparatus 300 is configured to perform CAE molding simulation operations, such as those described in the flowchart of FIG. 3, and transmit simulation results, such as molding conditions, to the injection molding machine 302 (or the controller 308) through a connection there between, such as a hardwired connection or a wireless coupling. Next, the injection molding machine 302 takes into account the simulation molding results transmitted from the computing apparatus 300, and performs an actual injection molding process to produce the FRT composite article.

In some embodiments of the present disclosure, the injection molding machine 302 includes a screw chamber 312, heating elements 314 configured to heat the screw chamber 312, a hopper 316 configured to hold composite pellets 318, and a screw-driving motor 320.

In some embodiments of the present disclosure, the composite pellets 318 include a polymeric material having a plurality of fibers therein. In some embodiments of the present disclosure, the polymeric material is PP (Polypropylene), PBT (Polybutylene terephthalate), nylon, or PC (Polycarbonate). In some embodiments of the present disclosure, the fibers are glass fibers or carbon fiber.

In some embodiments of the present disclosure, the composite pellets 318 are grouped into two categories based on fiber length: short fiber-reinforced thermoplastics (SFRTs) with a fiber length of about 0.2 to 0.4 mm, and long fiber-reinforced thermoplastics (LFRTs) having a fiber length of about 10 to 13 mm. LFRTs can yield continuous-fiber reinforcement. LFRT pellets are more extensively employed in automotive industrial fabrication than SFRT pellets.

Referring to FIG. 14, in some embodiments of the present disclosure, the injection molding machine 302 further includes a screw 400 positioned in the screw chamber 312 and driven by the screw-driving motor 320 for feeding composite molding resins 402, such as thermoplastics, into a mold cavity 404 of the mold 304 via a nozzle 406.

In some embodiments of the present disclosure, the molding machine 302 is equipped with sensors for sensing the velocity of the screw 400, the pressure of the screw chamber 312 (the filling pressure in the filling stage and the packing pressure in the packing stage), and the temperature of the screw chamber 312 (the filling temperature in the filling stage and the packing temperature in the packing stage).

In some embodiments of the present disclosure, the mold 304 includes a fixed-side mold 304A and a movable-side mold 304B. Furthermore, inside the mold 304, a sprue portion 408, a runner portion 410, a gate portion 412 and the mold cavity 404 are formed so as to be arranged in the above-mentioned order from the injection molding machine 10. The sprue portion 408 of the mold 304 is connected to the screw chamber 312 via the nozzle 406.

In some embodiments of the present disclosure, the screw-driving motor 320 includes an electric motor, a hydraulic actuator, or a combination thereof; in addition, the screw-driving motor 320 is configured to, in response to control signals from the controller 308, rotate the screw 400 and move the screw 400 toward the nozzle 406 so as to transfer the composite molding resins 402 into the sprue portion 408 of the mold 304.

Figure 15:
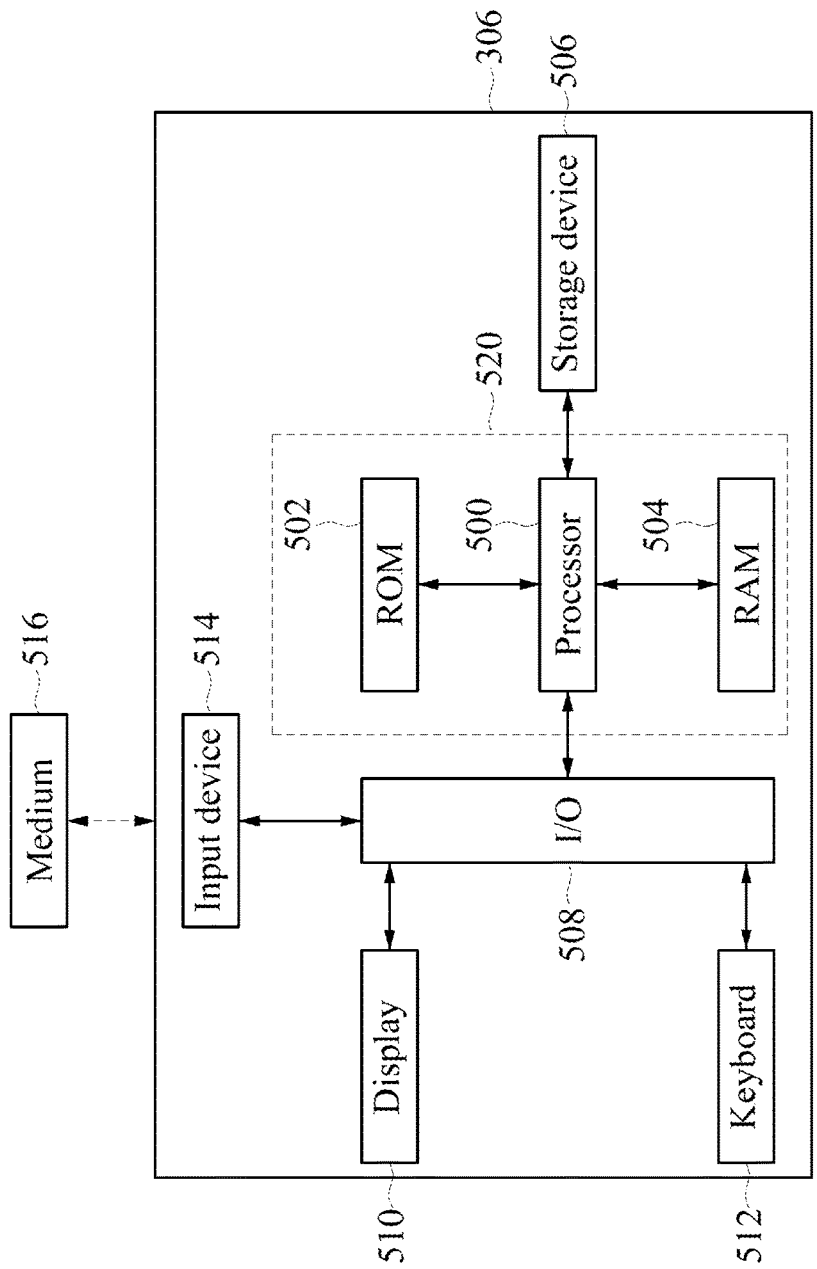
FIG. 15 is a functional block diagram of the computing apparatus in FIG. 13 in accordance with some embodiments of the present disclosure.

FIG. 15 is a functional block diagram of the computing apparatus 300 in FIG. 13 in accordance with some embodiments of the present disclosure. The computing apparatus 300 comprises a processing module 520 for executing CAE simulation software. In some embodiments of the present disclosure, the processing module 520 includes a processor 500, a read-only memory (ROM) 502, and a random access memory (RAM) 504. In some embodiments of the present disclosure, the computing apparatus 300 further comprises a storage device 506 and an input/output (I/O) interface 508. The processor 500 operably communicates with the ROM 502, the RAM 504, the storage device 506, and the I/O interface 508.

In some embodiments of the present disclosure, the computing apparatus 300 may further include a display 510, a keyboard 512, and an input device 514, such as a card reader or an optical disk drive. The input device 514 is configured to input computer instructions (software algorithms) stored in a non-transitory computer-readable medium 516, and the processor 500 is configured to execute the computer instructions for performing the CAE molding simulation operations according to the computer instructions.

In some embodiments of the present disclosure, the processor 500 reads the software algorithms from the input device 514 or the storage device 506, executes the calculation steps, and stores the calculated result in the RAM 504. In some embodiments of the present disclosure, the memory devices, i.e., the ROM 502 and the RAM 504, can be programmed to store codes for performing the CAE molding simulation operations.

In the CAE molding simulation operations, a virtual molding, i.e., the computer-implemented molding simulation using CAE simulation software, is performed by the computing apparatus 300 for the molding process. The simulation results, such as molding conditions, are then set based on the virtual molding and transmitted to the controller 308. In virtual molding using CAE simulation software, molding phenomena occur in the mold cavity 404 within a short period of time, and the result of the simulation on composite molding resin temperature, pressure, shear rate, etc. can be observed.

The modified Lipscomb equation proposed in the present disclosure can be applied in the CAE molding simulation operations. The modified Lipscomb equation can be used to obtain convergent numerical calculation results even with large $N_p$ values and can successfully simulate anisotropic flow patterns. Consequently, the molding system of the present disclosure can accurately predict the fiber orientation distribution.

In the present disclosure, a model of a stress tensor is proposed for easily obtaining convergent numerical results and successfully simulating anisotropic flow patterns in an injection molding simulation. As stated above, the ultimate aim of the present disclosure is to apply this model in simulation operations performed in the injection molding system for preparing a complex 3D geometrical FRT composite article.

The present disclosure provides a molding system for preparing a fiber-reinforced thermoplastic composite article. The molding system includes: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine; and a controller coupled to the processing module and configured to control the molding machine with the molding condition to perform an actual molding process for preparing the fiber-reinforced thermoplastic composite article. The anisotropic stress distribution of the composite molding resin is generated based in part on consideration of an integral effect of an elongational viscosity and a shear viscosity of the composite molding material.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A molding system for preparing a fiber-reinforced thermoplastic composite article, comprising:
   a molding machine;
   a mold disposed on the molding machine and having a mold cavity for being filled with a composite molding material including a polymeric resin and a plurality of fibers;
   a processing module configured to generate an anisotropic stress distribution of the composite molding material in the mold cavity based on a molding condition for the molding machine; wherein the anisotropic stress distribution of the composite molding resin is generated based in part on consideration of an integral effect of an elongational viscosity and a shear viscosity of the composite molding material; and
   a controller coupled to the processing module and configured to control the molding machine with the molding condition using the generated anisotropic viscosity distribution of the composite molding resin to perform an actual molding process for preparing the fiber-reinforced thermoplastic composite article.

2. The molding system of claim 1, wherein the integral effect is represented by an expression:

$$N_P(\dot{\gamma}) = \frac{\eta_E(\dot{\gamma})}{\eta_S(\dot{\gamma})}$$

where $N_P(\dot{\gamma})$ represents the integral effect, $\eta_E(\dot{\gamma})$ represents the elongational viscosity, and $\eta_S(\dot{\gamma})$ represents the shear viscosity.

3. The molding system of claim 1, wherein the processing module is further configured to generate the anisotropic stress distribution of the composite molding material based in part on consideration of an anisotropic rotational diffusion effect of the fibers in the composite molding material.

4. The molding system of claim 3, wherein the rotational diffusion effect of the fibers is represented by an expression:

$$D_R = D:A_4:D$$

where $D_R$ represents the anisotropic rotational diffusion effect of the fibers in the molding material, D represents a rate of deformation of the molding material, and $A_4$ represents an orientation distribution of the fibers.

5. The molding system of claim 1, wherein the processing module is further configured to generate the anisotropic stress distribution of the composite molding material based in part on consideration of an anisotropic degree of the fibers in the composite molding material.

6. The molding system of claim 5, wherein the anisotropic degree of the fibers is represented by a ratio of a fiber's shear rate to a resin's shear rate.

7. The molding system of claim 5, wherein the anisotropic degree of the fibers is represented by an expression:

$$\left(\frac{\dot{\gamma}_F}{\dot{\gamma}_R}\right)^2 = \frac{D:A_4:D}{D:D}$$

where $\dot{\gamma}_F$ represents the fiber's shear rate, $\dot{\gamma}_R$ represents the resin's shear rate, D represents a rate of deformation of the composite molding material, and $A_4$ represents an orientation distribution of the fibers.

8. The molding system of claim 1, wherein the processing module is configured to generate the anisotropic stress distribution of the composite molding material based on an expression:

$$\tau' = 2\eta'D + 2\eta'\phi N_P(\dot{\gamma})\left(\frac{D:A_4:D}{D:D}\right)D$$

where $\tau'$ represents the anisotropic stress distribution of the molding material, $\eta'$ represents a shear viscosity distribution of the composite molding material, D represents a rate of deformation of the molding material, ø represents a fiber volume fraction, $N_P(\dot{\gamma})$ represents the integral effect, and $A_4$ represents an orientation distribution of the fibers.

* * * * *